3,193,372
METHOD OF DEFOLIATING PLANTS
Erik K. Regel, Mission, Kans., assignor to Chemagro Corporation, New York, N.Y., a corporation of New York
No Drawing. Filed Jan. 26, 1962, Ser. No. 169,090
8 Claims. (Cl. 71—2.3)

This invention relates to the defoliation of crops and to the defoliating agents employed therefore.

One object of the invention pertains to the use of certain sulfur containing phosphonates and phosphonites as active agents in defoliation compositions. Another object of the invention provides for the application of derivatives of thiophosphonic acids and thiophosphonous acids to bring about defoliation at desired times. It is still another object of this invention to provide compositions for defoliating plants which comprise as an essential ingredient a derivative of one of thiophosphonic and thiophosphonous acids.

Another object of this invention is to provide a novel process for the preparation of S,S-disubstituted dithiochlorophosphates and S,S-disubstituted dithiochlorophosphites.

Still further objects and the entire scope of applicability of the present invention will become apparent from the detailed description given hereinafter; it should be understood, however, that the detailed description and specific examples, while indicating preferred embodiment of the invention, are given by way of illustration only, since various changes and modifications within the spirit and scope of the invention will become apparent to those skilled in the art from this detailed description.

Heretofore these materials could be prepared by the reaction of $PCl_3$ and the desired mercaptan in the ratio of approximately 1 mol of $PCl_3$ and 2 mols of the mercaptan. Upon working up the product unfortunately one obtains high percentage mixtures of mono and trisubstituted phosphorus compounds as well as the desired disubstituted dithiochlorophosphite. Kosolapoff in Organophosphorus Compounds, John Wiley and Sons, Inc., 1950, page 183, describes this reaction as disappointing since it leads to the formation of trisubstituted phosphites thus necessarily leaving unreacted an equivalent amount of monosubstituted dichloro compound thereby rendering the yield of disubstituted material very low together with the fact that separation of this low yield from the resulting byproducts is extremely difficult to achieve except with very efficient distillation columns.

I have found that these difficulties are completely obviated by the discovery that disulfides can be made to react with $PCl_3$ in the presence of aluminum chloride to yield after working up (as hereinafter more fully described) high yields of S,S-disubstituted chlorophosphites or chlorophosphates free from undesired byproducts of mono and trisubstitution which cannot form by way of this newly discovered reaction.

Although the exact nature of the mechanism of this reaction is not known it is believed to be as follows (1)    $PCl_3 + R\text{—}SS\text{—}R + AlCl_3 = (RS)_2PCl_3 \cdot AlCl_3$ Examples of suitable disulfides are dibutyl disulfide, dipropyl disulfide, dimethyl disulfide, diphenyl disulfide, ditolyl disulfide, butyl phenyl disulfide.

The resulting complex thus formed may be decomposed in a number of ways to yield the desired products represented by the following formulas (2)          $(RS)_2P\text{—}Cl$ or (3)          $(RS)_2P(O)Cl$ depending upon the mode of decomposition.

If the phosphite depicted by Formula 2 is desired the procedure described by Ferron, J. Can. Chem. 39, 843 (1961), whereby the product complex shown in Formula 1 above is reacted with diethyl phthalate followed by reduction with antimony. An alternate method of reduction to the trivalent phosphorus compound Formula 2 is provided by Komkov et al., Zhur. Obshchei Khim., 28, 2963-5 (1958), see Chem. Abst. 53, 9035 (1959), who describes reduction with aluminum, red phosphorus or metallic sodium.

If the phosphate depicted by Formula 3 is desired the procedure outlined in Example V infra is fully descriptive as well as Example VI.

Thus the dithio compounds of this invention can be conveniently prepared by the procedures referred to above where the chlorophosphorus compound is further reacted to form the desired dithiophosphonate.

If $PCl_3$ in reaction (1) is replaced with a hydrocarbon or monohalohydrocarbon phosphonous dichloride I have found that phosphonites and phosphonates can be likewise prepared by reacting said dichlorides with disulfides as described above. Examples of such compounds are phenylphosphonousdichloride,
butylphosphonousdichloride,
tolylphosphonousdichloride,
p-chlorophenylphosphonousdichloride,
methylphosphonousdichloride,
hexylphosphonousdichloride.

In other words whether the reaction of the disulfide is conducted with $PCl_3$ or with $RPCl_2$, where R is a hydrocarbon or monohalo hydrocarbon, I have discovered that the reactions result ultimately in the replacement of two of the chlorine atoms on the phosphorus atom by two-SR groups from the particular disulfide used.

Plants having an annual leaf drop can be defoliated in an unnatural manner at a desired time by the application of certain effective defoliation compositions resulting in defoliation similar to that obtained by the natural effect of a light frost. The chemicals of my invention possess this ability to cause defoliation when applied to plants by causing abscission of the leaves at the locus of the petiole resulting in leaf drop within 2–5 days following application prior to and without the aid of natural frost conditions. The benefits to be derived from a method of controlling defoliation of cotton at will are better quality cotton free from green-leaf stain and less crushed leaves and other debris in the picked cotton. If the leaves are removed prior to picking boll rot is reduced by natural sunlight and ventilation which additionally aids the bolls to open, a condition necessary before harvest. A further advantage of controlled leaf drop is the absence of tangled and matted foliage causing the spindles to become clogged and requiring frequent cleaning during the harvest operation. A further advantage of chemical defoliation permits earlier destruction of the stalks, an important aid in the control of pink bollworm and the boll weevil pests.

The defoliation and the resulting improvement in crop value and indirect control of pest infestation is achieved by applying defoliant compositions containing certain members of the class of organic thiophosphorus compounds in combination with surface contacting agents directly to the foliage of the plant. In particular the thiophosphorus compounds as used in combination with the surface agents can be represented by the general formula

wherein Y is selected from the group consisting of oxygen and sulfur, $n$ is selected from the group consisting of 0 and 1, R, $R_1$, and Z are selected from the group consisting of lower alkyl radicals containing 1 to 6 carbon atoms, chloroalkyl,
aryl,
alkaryl,
aralkyl,
alkylthioalkyl,
aralkenyl,
chloraryl,
alkylthioalkyl,
alkylsulfinylalkyl,
haloalkenyl, and cycoalkenyl, R, $R_1$, and Z can be the same or different.

Examples illustrated by the above general formula include but are not to be construed as limited thereto S,S-dipropyl propyldithiophosponite,
S,S-dipropyl propyldithiophosphonate,
S,S-dibutyl butyldithiophosphonite,
S,S-dibutyl butyldithiophosphonate,
S,S-diamyl amyldithiophosphonite,
S,S-diamyl amyldithiophosphonate,
S,S-dipropyl phenyldithiophosphonite,
S,S-dipropyl phenyldithiophosphonate,
S,S-dibutyl phenyldithiophosphonite,
S,S-dibutyl phenyldithiophosphonate,
S,S-diamyl phenyldithiophosphonate,
S,S-dipropyl tolyldithiophosphonite,
S,S-dipropyl tolyldithiophosphonate,
S,S-dibutyl tolyldithiophosphonite,
S,S-dibutyl tolyldithiophophonate,
S,S-diamyl tolydithiophosphonate,
S,S-dipropyl p-chlorophenyldithiophosphonite,
S,S-dipropyl p-chlorophenyldithiophosphonate,
S,S-dibutyl p-chlorophenyldithiophosphonite,
S,S-dibutyl p-chlorophenyldithiophosphonate,
S,S-diamyl p-chlorophenyldithiophosphonite,
S,S-diamyl p-chlorophenyldithiophosphonate,
S,S-dipropyl cyclohexenyldithiophosphonite,
S,S-dipropyl cyclohexenyldithiophosphonate,
S,S-dibutyl cyclohexenyldithiophosphonite,
S,S-cyclohexenyldithiophosphonate,
S,S-diamyl cyclohexenyldithiophosphonite,
S,S-diamyl cyclohexenyldithiophosphonate,
O,S-dipropyl propylthiophosphonite,
O,S-dibutyl butylthiophosphonite,
O,S-diamyl amylthiophosphonite,
O,S-dipropyl propylthiophosphonate,
O,S-dibutyl butylthiophosphonate,
O,S-diamyl amylthiophosphonate,
O,S-dipropyl phenylthiophosphonite,
O,S-dibutyl phenylthiophosphonite,
O,S-diamyl phenylthiophosphonite,
O,S-dipropyl phenylthiophosphonate,
O,S-dibutyl phenylthiophosphonate,
O,S-diamyl phenylthiophosphonate,
O,S-diisopropyl phenylthiophosphonate,
O,S-di-sec-butyl phenylthiophosphonate,
O,S-di-tert-butyl phenylthiophosphonate,
S,S-dipropyl ethylthioethyldithiophonite,
S,S-dibutyl ethylthioethyldithiophosphonite,
S,S-dipropyl ethylthioethyldithiophosphonate,
S,S-dibutyl ethylthioethyldithiophosphonate,
S,S-dibutyl chloromethyldithiophosphonite,
S,S-dibutyl dichloromethyldithiophosphonate,
S,S-dibutyl trichloromethyldithiophosphonate,
S,S-dipropyl chloroethyldithiophosphonite,
S,S-dibutyl chloropropyldithiophosphonate,
S,S-diamyl 4-chlorobutyldithiophosphonite,
S,S-dibutyl beta-styryldithiophosphonite,
S,S-dibutyl beta-styryldithiophosponhate,
O,S-dibutyl beta-styrylthiophosphonite,
O,S-dibutyl beta-styrylthiophosphonate,
S,S-dibutyl 2,2-dichlorovinyldithiophosphonite,
S,S-dibutyl 2,2-dichlorovinyldithiophosphonate,
S,S-dibutyl 3-chlorobutenyldithiophosphonite,
S,S-dibutyl-3-chloropropenyldithiophosphonate,
S,S-dimethyl methyldithiophosphonite,
S,S-dimethyl methyldithiophosphonate,
S,S-dihexyl hexyldithiophosphonite,
S,S-dihexyl hexyldithiophosphonate, and
S,S-diamyl trichloromethyldithiophosphonate.

The compositions of this invention consist of the active defoliant as described herein together with materials referred to in the art as adjuvants, diluents, carriers and the like. The thus diluted active ingredient is hereby rendered adaptable for application by means of jets, nozzles, spreaders, dusters, foggers, and similar devices used in the practice of the art. Typical adjuvants, carriers, and diluents are represented by water, kerosene, xylene, talc, pyrophyllite, and diatomaceous earths. With water as the diluent it is convenient to add wetting agents to effect good foilage coverage, such agents effective for this purpose are Triton X–100 (alkyl aryl polyether alcohol, made by condensing 1 mol of p-octylphenol with 10 mols of ethylene oxide), Tween 20 (polyoxyalkylene derivative of sorbitan monolaurate and glycerol sorbitan laurate). The emulsifying agents are generally employed in only very small concentrations, for example, in a quantity up to about 0.3% by weight based on the weight of the emulsion. However, higher concentrations may be used, as high as 5% by weight, provided that it does not exert an adverse affect on the plant preventing defoliation by causing phytotoxicity. When the active ingredient is formulated in oils such as mentioned above and also including heptane, heavy mineral oils, benzene and carbon tetrachloride such formulations may be applied directly to the plant to be defoliated with the addition of wetting agents.

The defoliants of the present invention are effective when applied in the range between 0.25 and 10 pounds per acre. The concentration of the active ingredient in the formulations may vary over wide ranges depending upon the diluents and the mode of application. Suspensions containing as little of 0.1 percent by weight can be effectively employed as well as concentrations as high as 5 percent, the criterion being effective coverage to the foliage.

The thiophosphorus esters comprising the active ingredient of this invention can be prepared by methods well known in the art. The formation of the carbon to phosphorus bond, for example, can be carried out according to the instructions of Clay, J. Org. Chem., 17, 892 (1952), or similarly by a modification of Clay as reported by Kinnear and Perren, J. Chem. Soc. 3437–45 (1952). The essence of this reaction involves the treating of alkyl chlorides with phosphorus trichloride in the presence of aluminum chloride and after reaction is essentially completed decomposing the resulting complex either with water or hydrochloric acid solution. The aryl and cycloalkenyl side chains are introduced onto the phosphorus in a manner similar to that described above except that in place of the alkyl-halophosphorus complex formed with alkyl halides, wherein no HCl is liberated, a true Friedel-Crafts reaction occurs with generous liberation of HCl. A comprehensive review of the Friedel-Crafts method of synthesis is described by Frank, Chemical Reviews, 61, 397 (1961). In the examples that follow by way of illustration unless otherwise indicated, all parts and percentages are by weight.

EXAMPLE I

S,S-dibutyl phenyldithiophosphonate

A mixture of 60 parts of phosphorus trichloride, 60 parts of aluminum chloride and 31.2 parts of benzene were heated under continuous stirring to reflux temperature (80° C.) until the evolution of HCl gas ceased. Upon cooling the reaction mixture to a temperature of −10° C. there was added 71.2 parts of n-butyldisulfide over a period of 1 hr. while agitating the reaction mixture. After this addition the mixture was stirred at room temperature for an additional 2 hours, then reacted for 45 minutes at 45° C.

The liquid complex then was decomposed by treatment with ice water and the organic layer diluted with chloroform. The chloroform solution was washed with diluted HCl, then with water until neutral, dried over anhydrous sodium sulfate, filtered and stripped. The stripped product was distilled under vacuum, and the fraction boiling at 148–154° C. at 0.08 mm. Hg pressure was collected as S,S-dibutyl phenyldithiophosphonate.

$N_D^{28}$ 1.5508
Percent P: calculated=10.2; found=10.0
Percent S: calculated=21.2; found=21.7

EXAMPLE II

*S,S-dibutyl tolyldithiophosphonate*

By substituting 37 parts of toluene for benzene in Example I S,S-dibutyl tolyldithiophosphonate is obtained.

$N_D^{20}$ 1.5558; boiling point 155–160° C. at 0.03 mm. Hg pressure
Percent P: calculated=9.8; found=9.7
Percent S: calculated=20.2; found=19.7

EXAMPLE III

*S,S-dibutyl p-chlorophenyldithiophosphonate*

In accordance with the procedure of Example I 45 parts of chlorobenzene in place of benzene provides S,S-dibutyl p-chlorophenyl dithiophosphonate. Boiling point 170–180° C. at 0.3 mm.

$N_D^{20}$ 1.5725
Percent Cl: calculated=10.5; found=10.8
Percent P: calculated=9.2; found=9.0

EXAMPLE IV

*S,S-dibutyl butyldithiophosphonate* n-Butylchloride (35 parts) was added under cooling to a mixture of 45.7 parts of phosphorus trichloride and 44.5 parts of aluminum chloride at 10 to 20° C. The mixture was agitated until it solidified after 1 hour. Mixture was allowed to stand for 12 hours, then 60 parts of n-butyl mercaptan was added. The solid complex went into solution and HCl gas was formed. After standing for 16 hours the resulting mixture was treated with ice water and the organic layer diluted with chloroform. The chloroform solution was washed with diluted HCl, then washed with water until neutral, dried over anhydrous sodium sulfate, filtered and stripped. The resulting product was distilled under vacuum and the fraction boiling at 125° C. at 0.02 mm. Hg was collected as S,S-dibutyl butyldithiophosphonate.

$N_D^{26}$ 1.5112
Percent P: calculated=11.0; found=10.5
Percent S: calculated=22.7; found=20.4

EXAMPLE V

*S,S-dibutyl dithiochlorophosphate* n-Butyldisulfide (59 parts) was added to a mixture of 44.5 parts of aluminum chloride and 46 parts of phosphorus trichloride at 0° C. while mixture was heavily agitated. When addition was completed the aluminum chloride went into solution. Agitation was continued for 2 hours. Mixture was then treated with ice, diluted with chloroform and washed with ice water. Chloroform solution was dried over sodium sulfate and stripped. The resulting S,S-dibutyl dithiochlorophosphate has a boiling point of 112° C. at 0.2 mm. pressure.

$N_D^{20}$ 1.5241
Percent Cl: calculated=13.6; found=13.0
Percent P: calculated=11.8; found=11.8

EXAMPLE VI

*S,S-dibutyl cyclohexenyldithiophosphonate* n-Butyldisulfide (59 parts) was added to a mixture of 50 parts of aluminum chloride and 46 parts of phosphorus trichloride at 0° C. while the mixture was heavily agitated. When addition was completed the aluminum chloride went into solution. Agitation was continued for 1 hour at room temperature. Upon cooling the reaction mixture to a temperature of 0° C. there was added 32.5 parts of cyclohexene over a period of 1 hour. The reaction mixture was allowed to stand overnight, then treated with ice water, diluted with chloroform and washed with water until neutral.

Chloroform solution was dried over sodium sulfate, filtered and stripped. The resulting S,S-dibutyl cyclohexenyldithiophosphonate has a boiling point of 135° C. at 0.05 mm. pressure; $n_D^{20}$ 1.5375.

Percent P: Calculated=10.1; found=9.8
Percent S: Calculated=20.8; found=23.5

EXAMPLE VII

*S,S-dibutyl phenyldithiophosphonite*

60 g. phenyldichlorophosphine were placed in a 250 ml. set-up under a nitrogen blanket and 80 g. n-butylmercaptan added in 3 hours and the temperature allowed to rise to 90° C. To complete reaction the mixture was heated for 16 hours at 110–120° C. and then distilled. The fraction boiling at 145–155°/0.05 mm. Hg was collected and represents S,S-dibutyl phenyldithiophosphonite; $n_D^{26}$ 1.5548.

EXAMPLE VIII

*S,S-diethyl phenyldithiophosphonate*

39 g. (0.5 M) benzene 103 g. (0.75 M) PCl₃ and 33.3 g. (0.25 M) anhydrous AlCl₃ were reacted together for 4 hours at reflux temperature until hydrogen chloride-evolution ceased. The mixture was then cooled to 0° C. and 67.2 g. (0.55 M) diethyldisulfide was added dropwise under vigorous stirring. Stirring was continued for 10 hours at 25° C. The mixture then was drowned in ice water, the organic layer taken up in benzene and washed several times with dilute HCl and finally with water until neutral and dried over anhydrous sodium sulfate. After removal of the sodium sulfate by filtration and stripping off the solvent the obtained residue was a yellow oil, 83.5 g., $n_D^{20}$ 1.5955. Fractionation of the crude material yielded S,S-diethylphenyldithiophosphonate.

EXAMPLE IX

*S,S-diphenyl phenyldithiophosphonate*

18 g. phenyldichlorophosphine, 21.8 g. diphenyl disulfide and 13.3 g. aluminum chloride in 25 ml. methylene chloride reacted as described in Exp. VIII above yielded S,S-diphenyl phenyldithiophosphonate.

EXPERIMENTAL DEFOLIATION DATA

Several dithiophosphorus derivatives exemplary of this invention were emulsified in water with the aid of a wetting agent, specifically Triton X-171 (blend of octylphenyl-polyethylene glycol adduct having about 16 ethylene oxide units with higher alkyl sulfates having 10–18 carbon atoms in the alkyl group). These suspensions were applied to mature cotton at the rate of one pound active ingredient per acre as a 0.3% emulsion. The Triton X-171 was used in an amount of 6% of the weight of the dithiophosphorus compound. The relative defoliation (abscissioning) after four days is shown in the table below where 10=good defoliation and 0=no defoliation and the numbers in between 0 and 10 indicate decreasing activity from 10 to 0.

Compound tested: Defoliation rating
- S,S-dibutyl cyclohexenyldithiophosphonate ----- 6
- S,S-dibutyl phenyldithiophosphonate ----------- 9
- S,S-dibutyl tolyldithiophosphonate ------------ 8
- S,S-dibutyl p-chlorophenyldithiophosphonate ---- 8
- S,S-dibutyl butyldithiophosphonate ------------ 7
- S,S-dibutyl ethylthioethyldithiophosphonate ---- 9
- S,S-dibutyl butylsulfinylbutyl dithiophosphonate -- 4

I claim:

1. The method of defoliating plants which comprises contacting the plant, in an amount sufficient to cause defoliation with a compound corresponding to the formula

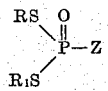

wherein R and $R_1$ are lower alkyl and Z is selected from the group consisting of lower alkyl, phenyl, chlorophenyl, lower alkylphenyl, benzyl, lower alkylthioalkyl and cycloalkenyl wherein the cycloalkenyl contains 5 to 6 carbon atoms.

2. The method of defoliating plants which comprises contacting the plant, in an amount sufficient to cause defoliation, with S,S-dibutyl phenyldithiophosphonate.

3. The method of defoliating plants which comprises contacting the plant, in an amount sufficient to cause defoliation, with S,S-dibutyl tolyldithiophosphonate.

4. The method of defoliating plants which comprises contacting the plant, an an amount sufficient to cause defoliation, with S,S-dibutyl butyldithiophosphonate.

5. The method of defoliating plants which comprises contacting the plant, in an amount sufficient to cause defoliation, with S,S-di(lower alkyl)phenyldithiophosphonate.

6. The method of defoliating plants which comprises contacting the plant, in an amount sufficient to cause defoliation, with S,S-di(lower alkyl) lower alkylphenyldithiophosphonate.

7. The method of defoliating plants which comprises contacting the plant, in an amount sufficient to cause defoliation, with S,S-di(lower alkyl) lower alkylthioalkyldithiophosphonate.

8. The method according to claim 1 wherein the plant is cotton.

References Cited by the Examiner

UNITED STATES PATENTS

| | | | |
|---|---|---|---|
| 2,665,294 | 1/54 | Kosolapoff | 260—461 |
| 2,841,486 | 7/58 | Osborn et al. | 71—2.3 XR |
| 2,907,787 | 10/59 | Hoffmann et al. | 260—461 |
| 2,927,014 | 3/60 | Goyette | 71—2.3 |
| 2,955,803 | 10/60 | Goyette | 71—2.3 |
| 2,965,467 | 12/60 | Markley | 71—2.7 |
| 2,979,391 | 4/61 | Markley | 71—2.3 XR |
| 3,094,405 | 6/63 | Fon Toy et al. | 71—2.7 |
| 3,158,461 | 11/64 | Weil | 71—2.7 |

LEWIS GOTTS, *Primary Examiner.*

MORRIS LIEBMAN, IRVING MARCUS, *Examiners.*